US008204725B1

(12) United States Patent
Thüerey et al.

(10) Patent No.: US 8,204,725 B1
(45) Date of Patent: Jun. 19, 2012

(54) REAL-TIME BREAKING WAVES FOR SHALLOW WATER SIMULATIONS

(75) Inventors: Nils Thüerey, Zurich (CH); Matthias Müller-Fischer, Staäfa (CH); Simon Schirm, Zürich (CH); Markus Gross, Uster (CH)

(73) Assignee: NVIDIA Corporation, Santa Clara, CA (US)

( * ) Notice: Subject to any disclaimer, the term of this patent is extended or adjusted under 35 U.S.C. 154(b) by 759 days.

(21) Appl. No.: 12/180,454

(22) Filed: Jul. 25, 2008

(51) Int. Cl.
  *G06G 7/50* (2006.01)
  *G06T 13/00* (2011.01)
(52) U.S. Cl. .......................................... 703/9; 345/473
(58) Field of Classification Search .................. 703/5, 9; 345/473
  See application file for complete search history.

(56) References Cited

U.S. PATENT DOCUMENTS 7,373,284 B2  5/2008  Stabelfeldt et al.
2001/0044706 A1  11/2001  Yoshikawa et al.

OTHER PUBLICATIONS

Thurey et al, "Real-time Breaking Waves for Shallow Water Simulations", graphics.ethz.ch, Jul. 24, 2007, 8 pages.*
Nils Thurey et al, "Real-time Breaking Waves for Shallow Water Simulations", show of date as Jul. 24, 2007 5:45 AM, 1 page.*
Hieu et al "Numerical simulation of breaking waves using a two-phase flow model", Grad School of Science and Eng. Saitama Univ. Apr. 2004.*
Klein, et al. "Simulation, Modeling and Rendering of Incompressible Fluids in Real Time," 2003.

Layton, et al. "A Numerically Efficient and Stable Algorithm for Animating Water Waves," The Visual Computer, 18/1:41-53, 2002.
Loviscach, Jorn. "Complex Water Effects at Interactive Frame Rates," Journal of WSCG, 11:298-305, 2003.
Maes, et al. "Efficient Animation of Water Flow of Irregular Terrains," GRAPHITE 2006, pp. 107-115, 2006.
Mihalef, et al. "Animation and Control of Breaking Waves," Proc. of the ACM SIGGRAPH/ Eurographics Symposium of Computer Animation, pp. 315-324, 2004.
O'Brien, et al. "Dynamic Simulation of Splashing Fluids," Computer Animation 1995, Geneva, Switzerland, Apr. 1995.
Peachey, Darwyn R. "Modeling Waves and Surf," In SIGGRAPH '86: Proceedings of the 13th annual conference on Computer graphics and interactive techniques, pp. 65-74, New York, NY, USA, 1986.
Stam, Jos. "Stable Fluids," Proc. of ACM SIGGRAPH, pp. 121-128, 1999.
Takahashi, et al. "Realistic Animation of Fluid With Splash and Foam," Computer Graphics Forum, 22 (3), 2003.
Tessendorf, Jerry. "Simulating Ocean Water," SIGGRAPH 2004 Course Notes 31, 2004.
Thurey, et al. "Animation of Open Water Phenomena with Coupled Shallow Water and Free Surface Simulations," Proc. of the ACM SIGGRAPH / Eurographics Symposium on Computer Animation, 2006.

(Continued)

*Primary Examiner* — David Silver
(74) *Attorney, Agent, or Firm* — Patterson & Sheridan, LLP

(57) ABSTRACT

One embodiment of the present invention sets forth a technique for efficiently simulating breaking waves in real-time. A two-dimensional shallow water height field simulation generates height and velocity information used to generate a wave line for each wave within the height field that satisfies criteria for overturning. For each overturning wave, a wave sheet is created from particles generated relative to points on the respective wave line. Each wave sheet may move separately from an underlying wave that gave rise to the wave sheet, allowing the wave sheet to fall and break, creating a realistic appearance. As a falling wave sheet collides with the underlying wave or water surface, free particles may be generated to simulation spray visible on a real breaking wave.

20 Claims, 11 Drawing Sheets

OTHER PUBLICATIONS

Wang, et al. "Efficient Rendering of Breaking Waves Using MPS Method," Journal of Zhejiang University SCIENCE A, Jun. 2006.
Miklos, "Real-Time Fluid Simulation Using Height Fields," Summer 2004, Computer Graphics Lab, ETH Zurich, 42 pages.
Office Action in U.S. Appl. No. 12/180,457, mailed Jan. 3, 2011.
Chen, et al. "Two-Dimensional Navier-Stokes Simulation of Breaking Waves," 1999.
Chen, et al. "Real-Time Fluid Simulation in a Dynamic Virtual Environment," IEEE Computer Graphics and Applications, vol. 19, No. 3, pp. 52-61 (May-Jun. 1997).
Enright, et al. "Animation and Rendering of Complex Water Surfaces," ACM Trans. Graph., 21(3):736-744, 2002.
Foster, et al. "Practical Animation of Liquids," In Proc. Of ACM SIGGRAPH. 2001.
Foster, et al. "Realistic Animation of Liquids," Graphical Models and Image Processing, 1996.
Fournier, et al. "A Simple Model of Ocean Waves," In SIGGRAPH '86: Proceedings of the 13$^{th}$ annual conference on Computer graphics and interactive techniques, pp. 75-84, New York, NY, USA, 1986.
Hagen, et al. "Visual Simulation of Shallow-Water Waves," Simulation Modeling Practice and Theory, 13, Sep. 2005.
Hinsinger, et al. "Interactive Animation of Ocean Waves," Jul. 2002.
Irving, et al. "Efficient Simulation of Large Bodies of Water by Coupling Two and Three Dimensional Techniques," ACM Trans. Graph., 25, 2006.
Jeschke, et al. "A Procedural Model for Interactive Animation of Breaking Ocean Waves," WSCG POSTERS Proceedings, Plzen, Czech Republic, Feb. 2003.
Kass, et al. "Rapid, Stable Fluid Dynamics for Computer Graphics," ACM Trans. Graph., 24(4):49-55, 1990.

* cited by examiner

REAL-TIME BREAKING WAVES FOR SHALLOW WATER SIMULATIONS

BACKGROUND OF THE INVENTION

1. Field of the Invention

Embodiments of the present invention relate generally to physics simulation systems and more specifically to real-time breaking waves for shallow water simulations.

2. Description of the Related Art

Fluid simulation systems have undergone significant improvements recently with respect to visual accuracy in various settings, such as interactions between materials, phase changes, and multi-phase behavior, as seen in breaking waves. However, most of these improvements are not available to interactive, real-time environments, such as games. One major barrier to implementing recent techniques in real-time environments is a large computational throughput that is needed for solving full three-dimensional (3D) fluid motion, and tracing free surfaces for rendering.

One approach to increasing simulation performance is to reduce the problem from three dimensions to two dimensions. Instead of using 3D grid cells, a liquid is represented by a two-dimensional (2D) height field comprising 2D grid cells, each with an associated height. For calm situations (e.g., smooth waves and ripples), this representation can capture principle visual properties of a free surface fluid. However, for other more general situations, like breaking waves at a shoreline, a height field model does not capture important visual effects or a proper sense of motion.

As graphics applications develop greater visual richness and accuracy, breaking waves become a more important visual feature. However, current techniques for simulating breaking waves do not enable real-time simulation performance, forcing application developers to employ techniques that yield less desirable results (e.g., lower accuracy or sub real-time performance).

As the foregoing illustrates, what is needed in the art is a technique for efficiently simulating breaking waves for efficient real-time simulation.

SUMMARY OF THE INVENTION

One embodiment of the present invention sets forth a method for simulating a breaking wave. The method includes the steps of generating a height field and a velocity field at a first time step using shallow water simulation, computing rigid body coupling effects to account for rigid bodies within the height field and velocity field, modifying the height field and velocity field based on the rigid body, detecting candidate regions for one or more overturning waves, and generating a first wave line within a first candidate region that represents the wave front of a corresponding wave. The method also includes the steps of generating a second wave line for the corresponding wave by projecting points on the first wave line forward by one time step relative to the first time step, and generating a fluid sheet that represents the corresponding wave based on points from the first wave line and points on the second wave line.

One advantage of the disclosed method is that realistic wave-breaking effects may be generated without using a full, 3D computational fluid model, thereby enabling such effects in real-time graphics applications.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
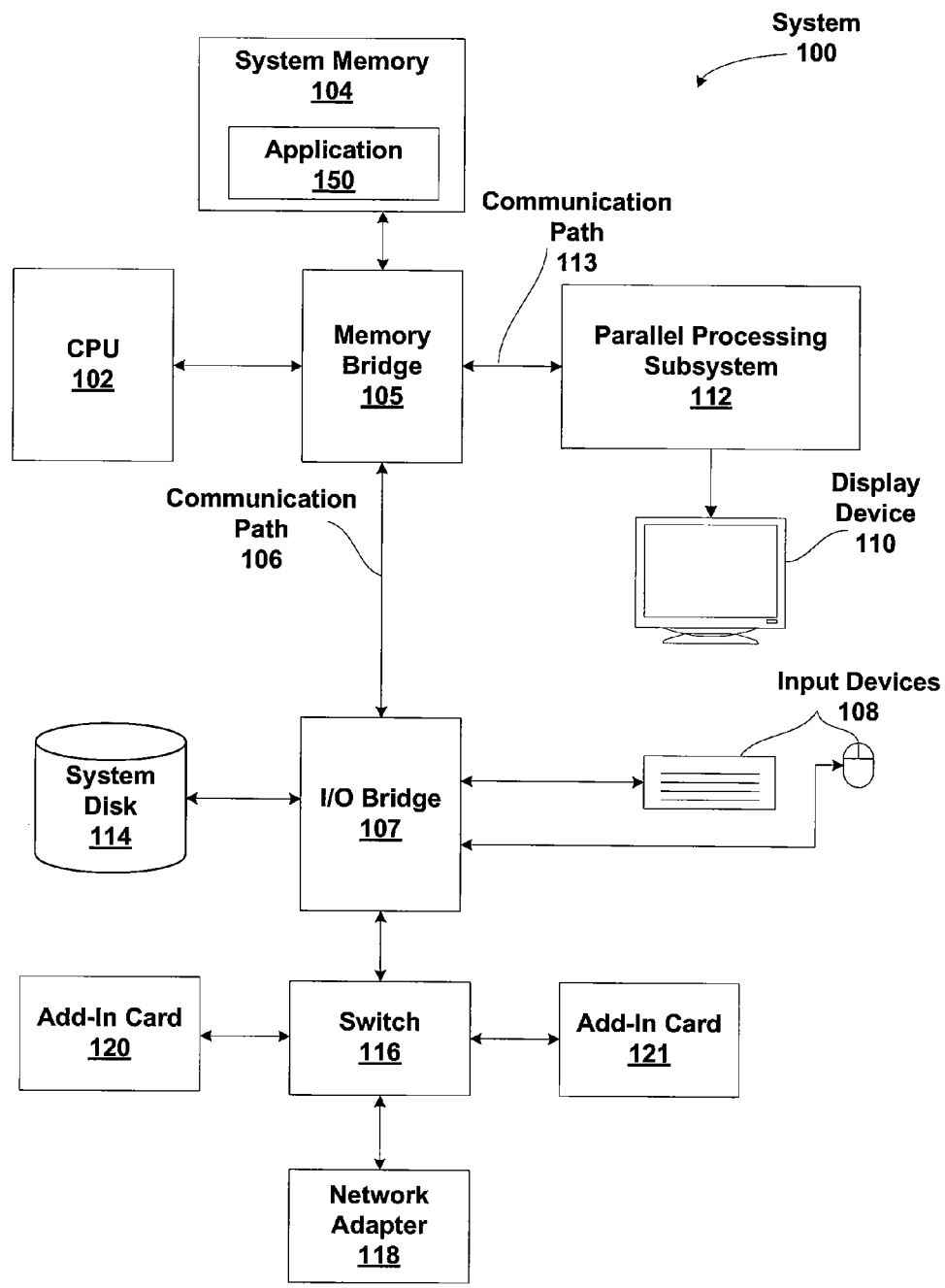
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

Application 150 may perform certain processing steps and may program the parallel processing subsystem 112 to perform related processing steps. For example, application 150, in conjunction with parallel processing subsystem 112, may generate graphics images to be displayed on display device 110, or stored to disk system 114.

Persons skilled in the art will understand that the architecture described in FIG. 1 in no way limits the scope of the present invention and that the techniques taught herein may be implemented on any properly configured processing unit, including, without limitation, one or more CPUs, one or more multi-core CPUs, one or more GPUs, one or more multi-core GPUs, or the like, without departing the scope of the present invention.

Figure 2A:
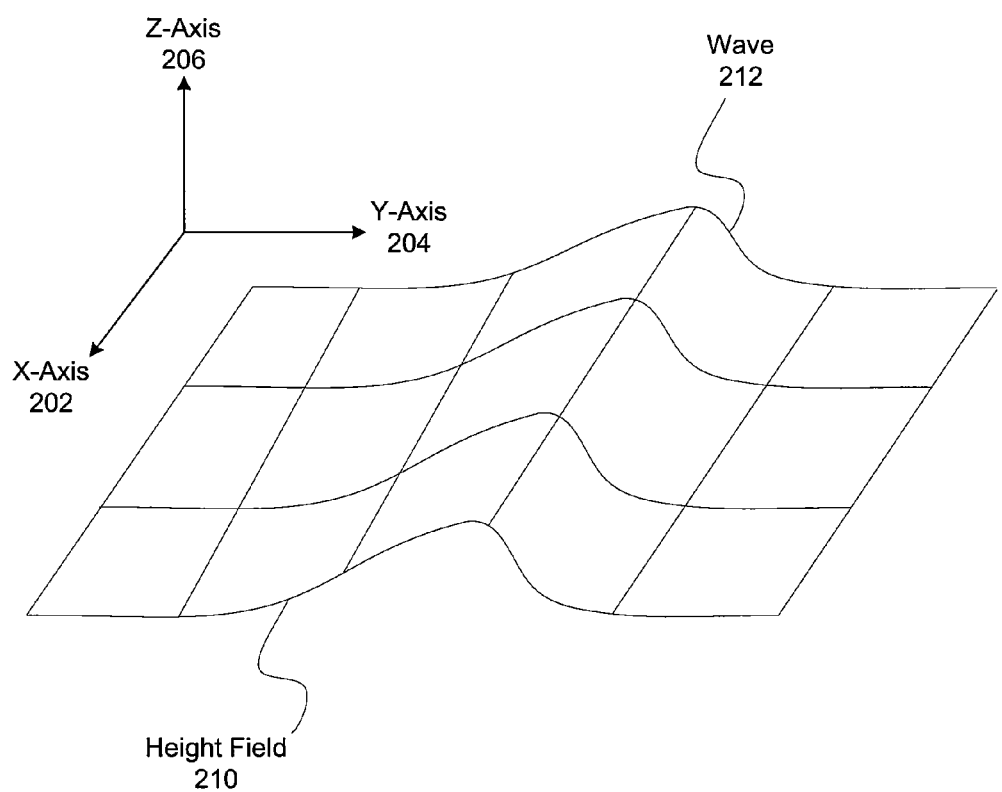
FIG. 2A illustrates a wave represented in a height field.
Figure 2B:
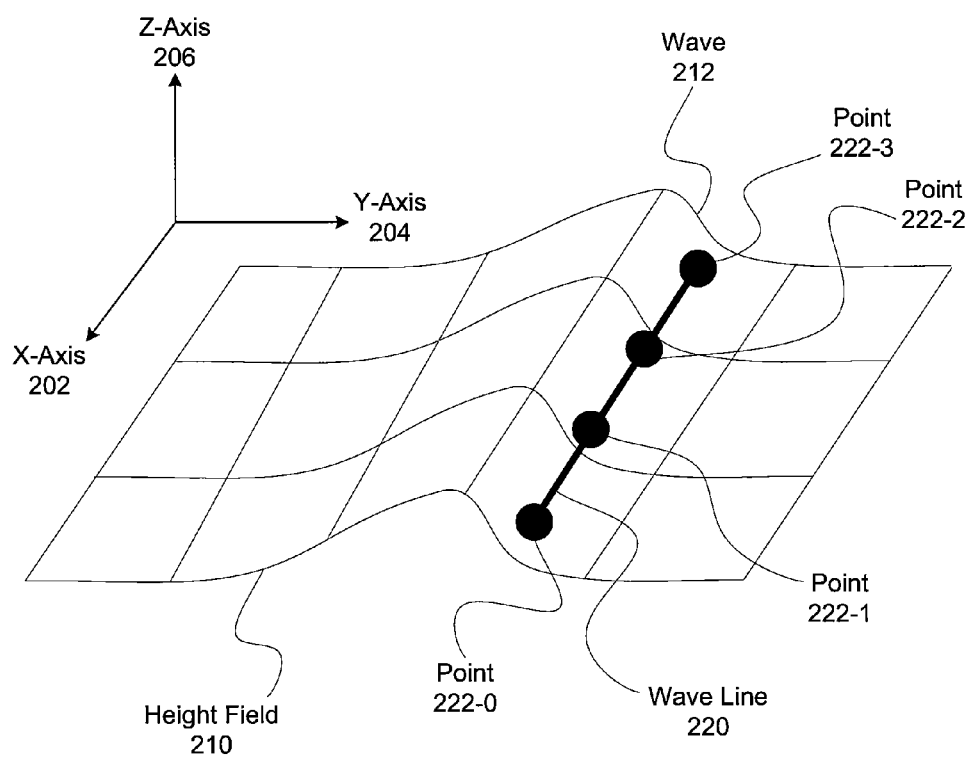
FIG. 2B illustrates a wave line computed from the wave represented in the height field, according to one embodiment of the invention.
Figure 2C:
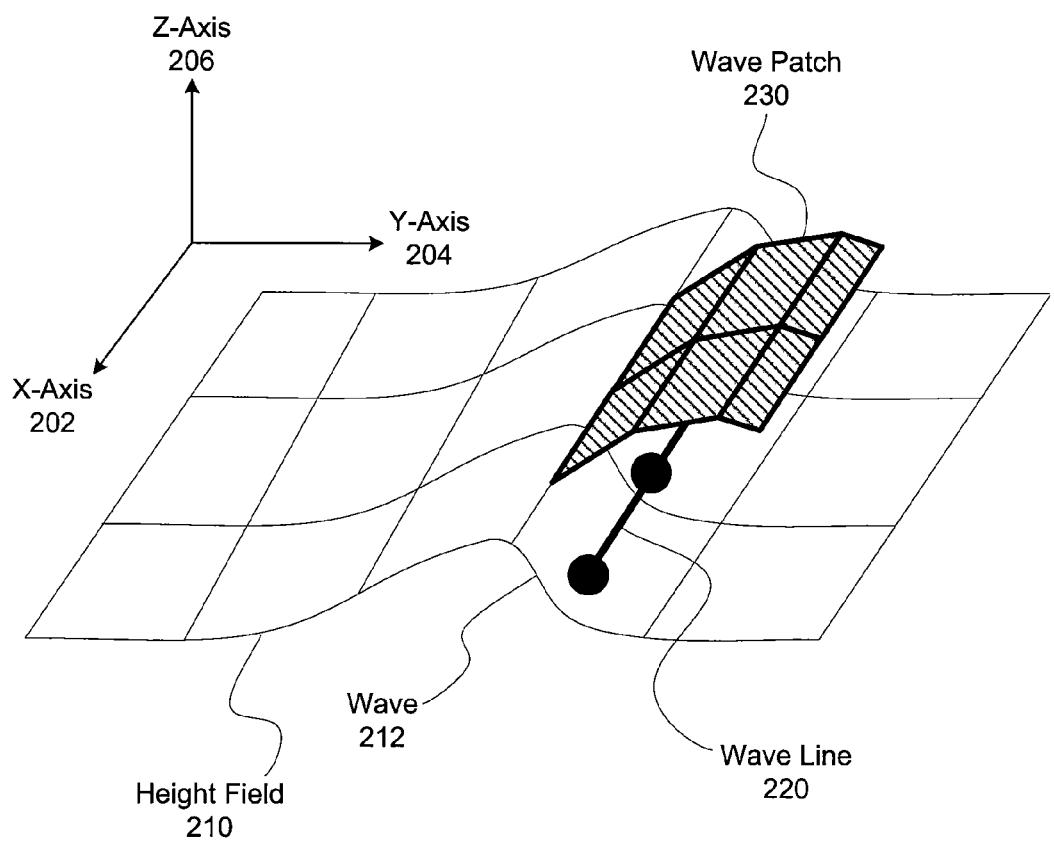
FIG. 2C illustrates a wave patch computed from the wave and wave line from the height field, according to one embodiment of the invention.

FIGS. 2A through 2C summarize a method for generating real-time breaking waves for shallow water simulations. FIGS. 3 and 4 detail wave line construction, an adaptive process used to generate wave lines, which comprise dynamically generated vertices that may be optimized to represent a wave front of a given wave. FIG. 5 illustrates wave patch generation. Wave patches are built from wave lines and comprise basic building blocks for generating geometric objects that represent a breaking wave.

FIG. 2A illustrates a wave 212 represented in a height field 210. An x-y plane defined by an x-axis 202 and a y-axis 204 may be used as a 2D simulation plane for 2D wave simulations within the height field 210. Gravity is defined to act along a z-axis 206. The height field 210 may be generated using a shallow water simulation.

Shallow water (SW) simulations reduce complex three-dimensional (3D) fluid models to a simplified representation comprising a two-dimensional (2D) height field. Equations used to describe the height field may be derived from Navier-Stokes (NS) equations, which are well known to properly characterize full 3D fluid flow.

One simplifying assumption for deriving height field equations from NS equations is that velocity does not vary significantly along the z-axis 206, and that a pressure gradient is constant from a liquid surface to a bottom surface. Thus, gravity and liquid pressure and the primary driving forces within a simulation. An additional simplifying assumption is that any liquid (such as water) undergoing simulation has effectively zero viscosity, so that well known Euler equations are valid. In this way, viscosity terms in the NS equations may be neglected.

The SW simulation may be performed using simplified shallow water Equations 1-3, below. A simplified notation for partial derivatives is used herein, whereby "$f_n$" denotes a partial derivative of function f along n, where n may be a spatial axis or time. A height value that describes water height above a ground surface terrain at point X is given as h(X, t), where t is time. The ground surface terrain is given by o(X), and the total height of water and ground surface terrain is given by H(X, t)=h(X, t)+o(X). A vector $\underline{u}$=(u, v) describes a horizontal velocity of fluid in the SW simulation, and g is a gravitational force perpendicular (along the z-axis) to the 2D simulation plane. A 2D simulation region within the 2D simulation plane comprises N(X) grid nodes within a size of Δx and Δy along the x-axis and y-axis, respectively. Equations 1 through 3 describe a process to compute a new height field at a given location on the 2D simulation plane for time t at point X.

$$H_t = -\underline{u} \cdot \nabla H - H(u_x + v_y) \quad \text{(Equation 1)}$$

Where, $$u_t = -\underline{u} \cdot \nabla u - gh_x \quad \text{(Equation 2)}$$

$$v_t = -\underline{u} \cdot \nabla v - gh_y \quad \text{(Equation 3)}$$

A staggered grid combined with a semi-Lagrangian advection step may be used to solve Equations 1-3. These equations describe a shallow water simulation that directly yields a full velocity field for the surface. This velocity field may be used to trace objects floating on the surface, and may be extended to incorporate a variety of boundary conditions to capture interesting flow effects such as flows through terrains and vortices behind obstacles to a flow.

FIG. 2B illustrates a wave line 220 computed from the wave 212 represented in the height field 210, according to one embodiment of the invention. Wave lines, such as wave line 220, may be detected at steep wave fronts and tracked, as described herein. Each wave line is defined by a set of points 222 generated along regions of steep gradients in the height field 210. Each wave line is generated to adaptively track a respective wave and can merge with other nearby wave lines, for example, in relation to merging waves. In one embodiment, wave lines are used to generate wave patches from connected particles representing fluid associated with an actual breaking wave. The particles are generated from the points 222 within wave line 220. Wave line construction is presented in detail in FIGS. 3A and 3B.

FIG. 2C illustrates a wave patch 230 computed from the wave 212 and wave line 220 in the height field 210, according to one embodiment of the invention. The wave patch 230 represents a fluid sheet of an overturning wave built from connected particles generated from points in a sequence of wave lines. A set of particles along the wave line 220 is spawned for each point 222 on the wave line 220. Wave patch construction is presented in greater detail in FIG. 4 and FIGS. 5A through 5C.

Figure 3A:
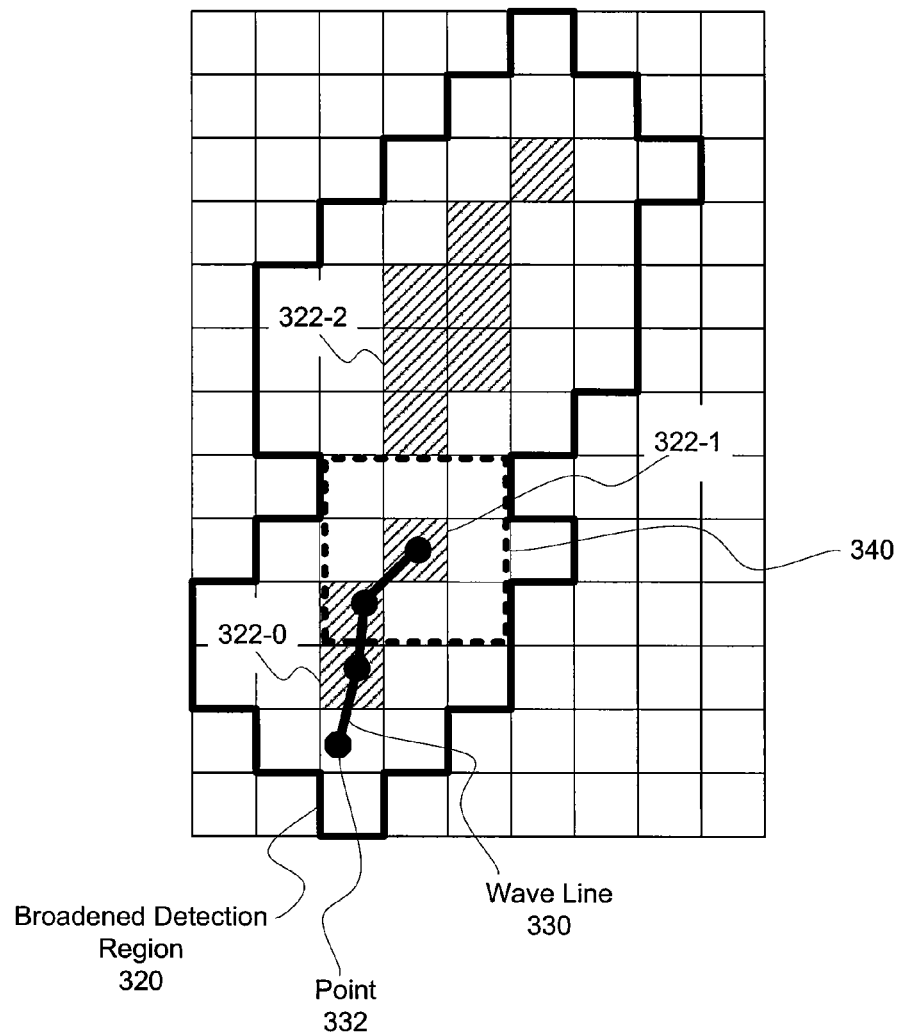
FIG. 3A illustrates wave line construction within a broadened detection region, according to one embodiment of the invention.

FIG. 3A illustrates wave line construction within a broadened detection region 320, according to one embodiment of the invention. Each grid region comprises a shallow water simulation node. Nodes 322 meet certain criteria for hosting a point that is added to a wave line 330. A broadened detection region 320 of connected grid nodes may be constructed around nodes 322. Region 340 is expanded in a detailed view in FIG. 3B, below.

Wave lines are constructed along steep wave fronts when certain conditions are met, as described in detail below. The wave lines are used to generate patches of connected particles representing the fluid of a breaking wave. The wave lines adaptively track wave fronts on a height field, merging with nearby waves as appropriate and creating appearance of continuity that tracks the natural motion of waves on the height field. Wave line construction comprises two processes, detection and advection. Wave line detection is a process of detecting specified conditions that may lead to a breaking wave. Advection is a process of simulating movement associated with the wave.

Wave line detection occurs in regions of steep gradients within the height field, indicating the wave may overturn and break. For example, a wave may overturn as the wave approaches a beach, where progressively shallower water causes the wave to grow progressively steeper and eventually overturn.

Decreasing fluid depth produces waves that a SW simulation may effectively capture, however, wave overturning and breaking is not an effect that may be naturally captured with a 2D simulation, such as a SW simulation, because wave overturning is essentially a 3D phenomenon. Fortunately, SW simulations typically generate a height field and velocity vectors that may be used in conjunction with the techniques described herein to create additional geometry, which may be used to create realistic breaking wave effects.

A line L of connected points along each wave front within a SW simulation is generated for waves that are candidates for overturning. The wave front of a candidate (a steep wave) may be detected by examining a gradient of fluid height in a respective height field. Any wave with a fluid height gradient greater than a specified threshold, $t_H$ may be considered a candidate. In addition to a fluid height gradient, wave velocity should be considered to avoid considering a back side of a wave as a candidate. At a wave front on a height field, fluid velocity opposes the fluid height gradient of the height field. Hence, each point $X \epsilon P_s$ in a SW grid that satisfies that criteria illustrated in Equation 4 becomes a candidate for inclusion in line L. For example, nodes 322 satisfy the criteria of Equation 4.

$$|\nabla H(X)| > t_H \text{ and } \nabla H(X) \cdot u(X) < 0 \quad \text{(Equation 4)}$$

The gradient of fluid height ($\nabla H$) may be computed using finite differences relative to the height field. The threshold $t_H$ is determined from actual discretization of the shallow water equations and user defined parameter $p_H$. Discretization influences a resulting shape of a wave via a gravitational force being applied at each time step, while $p_H$ can be used to select the overall amount of waves generated. In one embodiment $p_H = \frac{1}{4}$, and $t_H$ is computed using Equation 5.

$$t_H = p_H g \Delta t / \Delta x \quad \text{(Equation 5)}$$

The points in the set $P_s$ usually do not form a closed single layer along a wave front. To generate a sequence of connected points for L along the wave front, points within a distance of less than $p_d$ to any of the points in $P_s$ are also considered for inclusion in line L. In this way, small gaps may be avoided in L. In one embodiment, $P_d = 2\Delta x$. A flood-filling algorithm may be used to identify disconnected regions of points to generate the broadened detection region 320. $P_b$ denotes a single set of connected points of the broadened detection region 320. Line construction begins with an arbitrary point within $P_s$ and proceeds along a tangent vector of the height field.

Figure 3B:
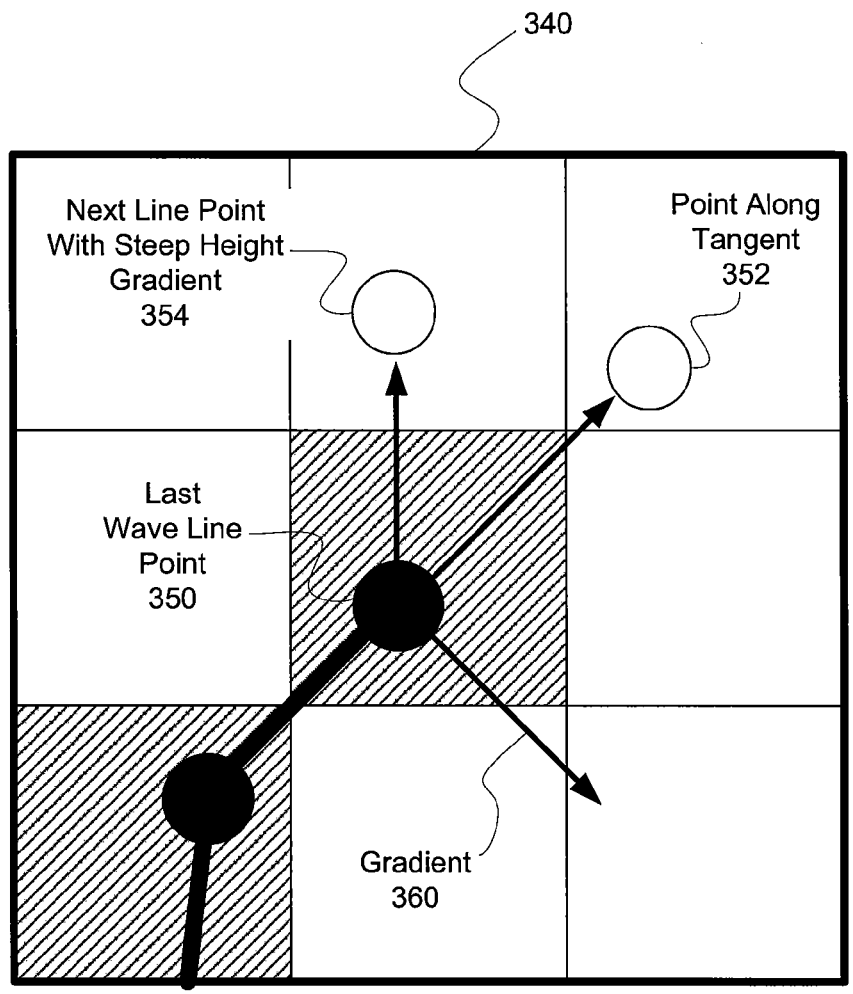
FIG. 3B illustrates wave line construction relative to a steep height gradient, according to one embodiment of the invention.
Figure 4:
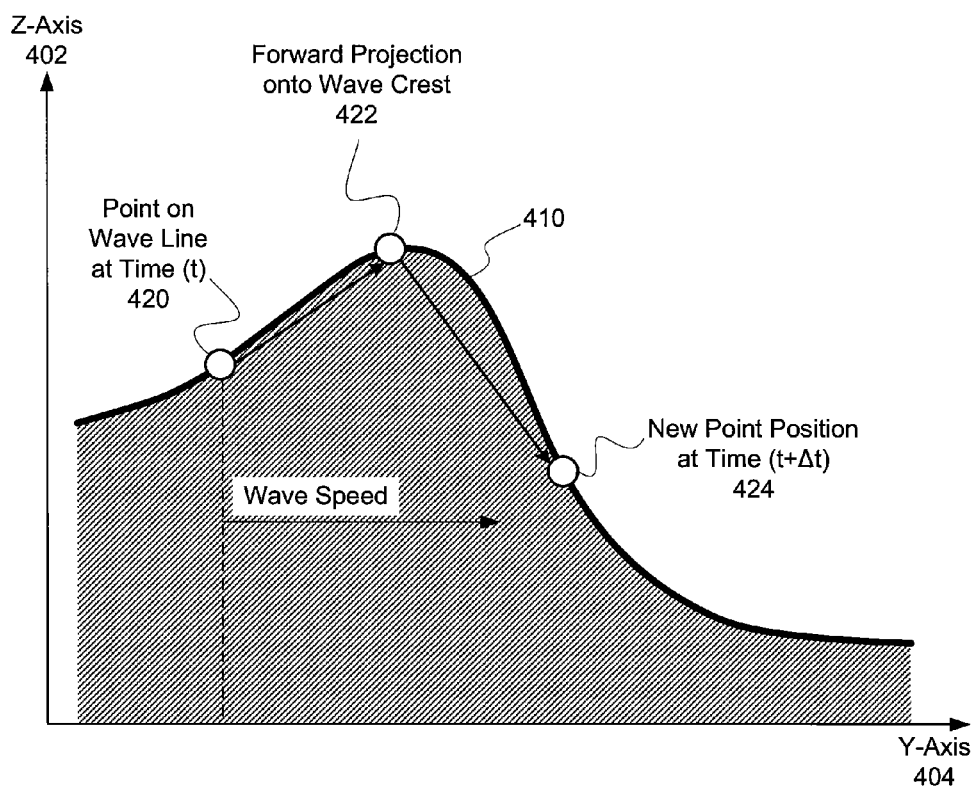
FIG. 4 represents a side view of wave line advection, according to one embodiment of the invention.

FIG. 3B illustrates wave line construction relative to a steep height gradient, according to one embodiment of the invention. Detail 340 illustrates key elements in the wave line construction process, which starts with the arbitrary point selected in FIG. 3A and is repeated for both tangent directions. At a last wave line point 350, a gradient 360 may be computed. A next line point with steep height gradient 354 and a point along tangent 352 may also be computed from the last wave line point 350 and the respective height field.

With $\nabla H = (g_1, g_2)$, the tangent two directions are given by $t_1 = (g_2, -g_1)$ and, $t_2 = (-g_2, g_1)$. The line construction process proceeds for one tangent direction until the next point along the tangent is not in the broadened detection region (e.g., not in the set $P_b$), signaling completion in the given direction. Then the process is applied along the opposing tangent direction. Given a point $X_n$ in $P_b$, the next point $X_n'$ may be computed using Equation 6, where t denotes a current tangent direction.

$$x_n' = x_n + \Delta x t \quad \text{(Equation 6)}$$

Due to scaling of the tangent with $\Delta x$, the line L is constructed of points with a distance of a respective simulation grid size. To ensure that relatively large steps that may be associated with Equation 6 do not accidentally exceed region $P_b$, the next point of L is computed by centering $X_n'$ to the point of steepest gradient, given in Equation 7.

$$x_{n+1} = x^n \epsilon L_g \text{ with MAX}(|\nabla H(x^n|) \quad \text{(Equation 7)}$$

Here line $L_g$ includes all points along a height field gradient at $X_n'$ that are in $P_b$. Point $X_{n+1}$ is added to L and connected to $X_n$. A new point $X_{n+1}$, is added in sequential steps (with n incrementing) until $X_{n+1}$ is no longer part of $P_b$, the broadened detection region 320. If $X_{n+1}$ is a distance of less than $P_b$ to the first point of the line, then the two points may be connected, completing the line by forming a loop.

A given point in $P_b$ may also fulfill Equation 4 at a subsequent time step. To avoid a second line from being initialized right next to a first line, all points of $P_s$ that are within a distance $p_d$ to an existing line are removed from $P_s$ after the first line is constructed.

FIG. 4 represents a side view of wave line advection, according to one embodiment of the invention. A cross section of a wave 410 is depicted for the wave 410 traveling in a SW simulation along a y-axis 404. Wave height (along a z-axis 402) at any point along the y-axis 404 may be represented by a height scalar value associated with the point.

To accurately track a wave front of a SW wave with wave line L, a combination of advection and wave velocity may be used in projecting forward motion along a steepest gradient on the wave front. Projection may be performed using a bisection method and an initial step size of length c. In one embodiment two through four steps are used to compute a desired target point.

Movement over time of a point P within line L is given by a gradient of the height field from a previous time step at time $t-\Delta t$. At the previous moment in time, P should be located at a correct position on the wave front, either from an initialization of the wave line, or from a previous advection step. Therefore, the movement direction of P at time t may be computed using $u_p - \nabla H(p)$.

Computing forward movement of point P on the wave line L should account for the case where a wave crest has passed P in an time step. To account for this situation, a forward projection is computed from a point on the wave line at time (t) 420 along $u_p$ (wave velocity vector) onto a local maximum of the fluid height field. This forward projection onto wave crest 422 is a starting point for another forward projection to the point of the steepest gradient on the wave front at position p'. The point at p' becomes a new point position at time $(t+\Delta t)$ 424 for the point on the wave line a time (t) 420. The new point at p' needs to be valid with respect to the original wave speed c, otherwise the new point at p' should be removed. In one embodiment, if |p'−p|>2c then the point at p' is removed from the wave line. Likewise, the wave and wave front region need to be steep enough to produce a wave. In one embodiment, if |u$_p$|<(t$_H$/2) then the point at p' is removed.

The length of a wave front can change significantly during normal wave motion. To efficiently adapt the wave line representation of the wave front, the wave line should be re-sampled during the forward motion of the wave. In one embodiment, the wave line is re-sampled at each time step. A new point is introduced if two neighboring points expand sufficiently far apart (>2Δx) and neighbors are merged if they are sufficiently close together (<Δx/2). A folding line can be avoided by merging segments when (p$_{n+}$1−p$_n$)·(p$_{n−}$1−p$_n$)>0 holds. A newly added point in the wave line may be initialized by averaging properties of the neighboring points. This process produces a wave line with segments that have similar scale as the simulation grid size throughout the lifetime of the wave line.

Figure 5A:
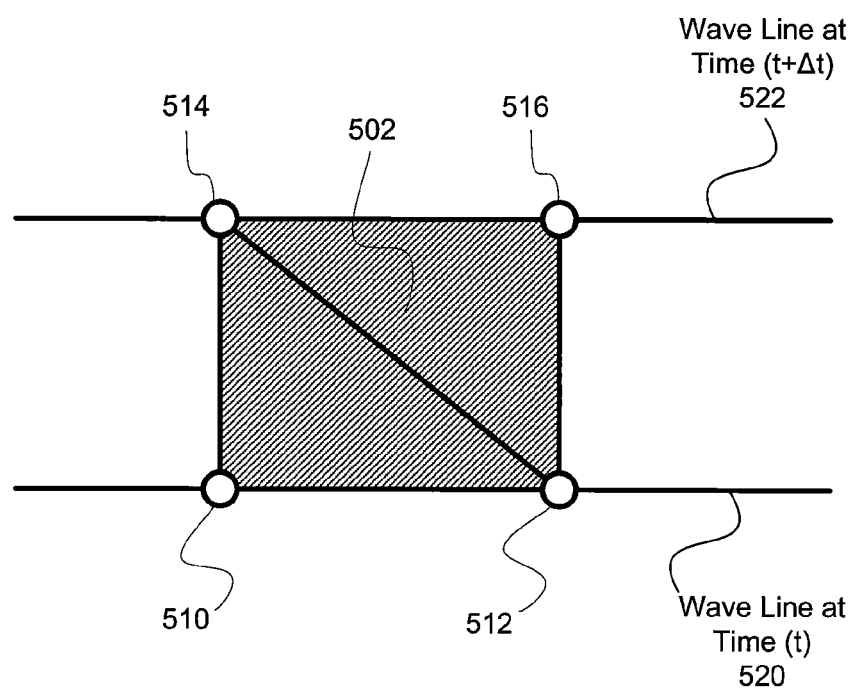
FIG. 5A illustrates direct connection between wave lines, according to one embodiment of the invention.
Figure 5B:
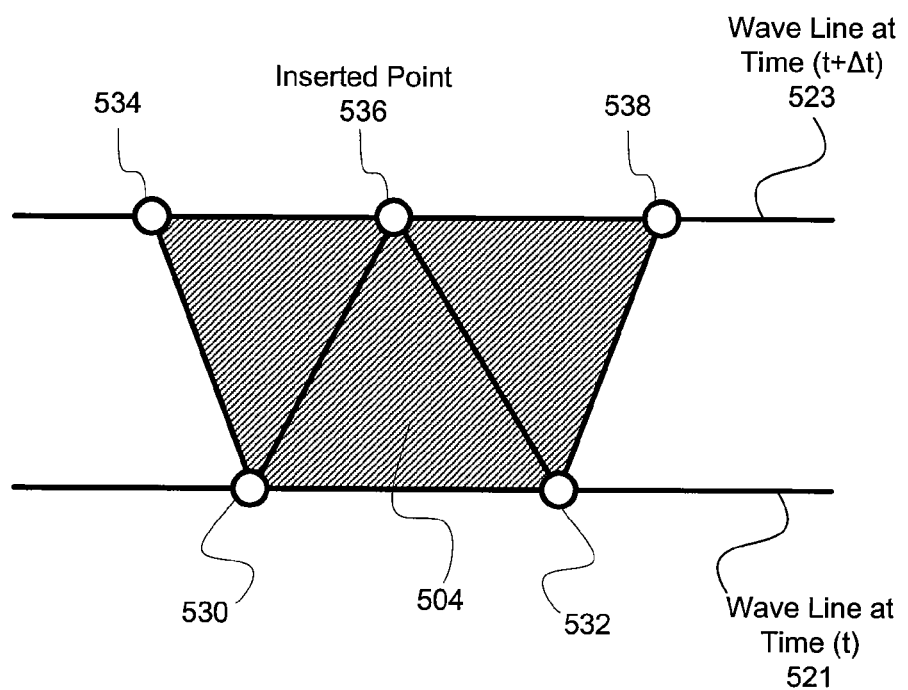
FIG. 5B illustrates refinement by point insertion between wave lines, according to one embodiment of the invention.
Figure 5C:
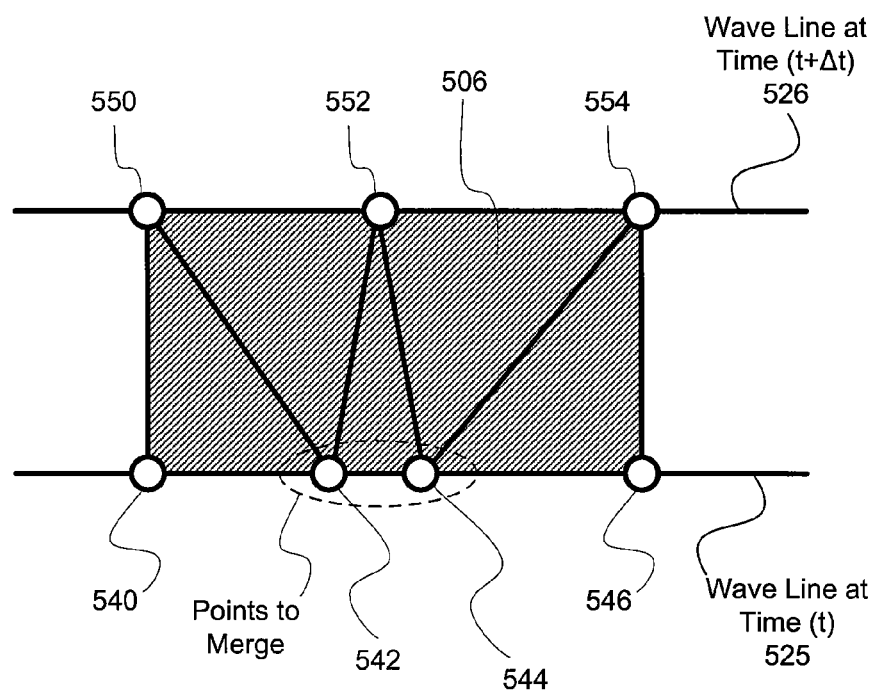
FIG. 5C illustrates coarsening by merging points between wave lines, according to one embodiment of the invention.

Adaptively adding and removing points within the wave line is discussed in more detail in FIGS. 5A-5C in the context of generating wave patches from points comprising sequential wave lines.

FIG. 5A illustrates direct connection between wave lines, according to one embodiment of the invention. Wave line at time (t) 520 includes points 510 and 512. In a subsequent time step, wave line at time (t+Δt) 522 includes points 514 and 516, where point 510 is projected to point 514 and point 512 is projected to point 516. In this case, the distance between points 514 and 516 is not sufficiently close to trigger merging of the two points and not sufficiently far to trigger an addition of an intervening point. A mesh 502 may be generated using points 510, 512, 514 and 516 as vertices.

FIG. 5B illustrates refinement by point insertion between wave lines, according to one embodiment of the invention. A wave line at time (t) 521 includes points 530 and 532, which are projected to points 534 and 538, respectively, due to motion of an associated wave front. In this scenario, points 534 and 538 have exceeded a distance of 2Δx, triggering the insertion of inserted point 536 between points 534 and 538 on wave line at time (t+Δt) 523. A mesh 504 may be generated from points 530 and 532 on wave line at time (t) and points 534, 536, and 538 on wave line at time (t+Δt) 523.

FIG. 5C illustrates coarsening by merging points between wave lines, according to one embodiment of the invention. A wave line at time (t) 525 includes points 540, 542, 544, and 546. In a previous advection step, points 542 and 544 were placed closer together than Δx/2 on wave line at time (t) 525. Therefore, points 542 and 544 should be merged into point 552 in wave line at time (t+Δt) 526. Points 540 and 546 project to points 550 and 554, respectively. A mesh 506 may be generated from points 540, 542, 544, and 546 on wave line at time (t) 525 and points 550, 552, and 554 on wave line at time (t+Δt) 526.

A fluid sheet of an overturning wave may be represented using a wave patch that is built from connected particles generated at a set of wave lines. In time interval t$_g$ a set of particles along a wave line is spawned for each point on the wave line, adding additional quads a wave patch is substantially structured according to the points on the wave line. The connectivity of the particles matches the connectivity of the points in the wave line. If a previous set of particles exists, the new set is connected to the previous set. If a given point on a wave line exists in two sequential time steps, then generating the particles sets is trivial, as is the case of FIG. 5A. If, however, points are added or removed from a wave line, the differences are marked and corresponding connection shapes are inserted to close a resulting wave patch surface, referred to as a wave sheet. To ensure that the three cases of projecting wave lines depicted in FIGS. 5A—5C generate meshes that may be closed using simple deterministic techniques, only one point should be merged or inserted for a given point within time interval t$_g$.

In one embodiment, velocities of the particles are computed from an associated source point on a line u$_l$. An overturning portion of a wave typically generates significantly higher velocity at the top than the bottom of the wave. Forward acceleration may be approximated as being proportional to potential energy, given by initial fluid height H$_j$. Using this approximation, Equation 8 computes a velocity vector (u$_s$) of a particle on a wave sheet at position X.

$$u_s = (1 + p_v g(H(X) - H_i))u_l \qquad \text{(Equation 8)}$$

A parameter (p$_v$) controls the strength of height influence (potential energy). As a wave line tracks the steepest point of a wave front, generated particles have to be positioned at the wave crest to correctly present an impression of an overturning wave. Particles are generated at the wave front and moved to the crest of the wave along an inverted wave velocity line (−u$_l$). To ensure overlap of the wave sheet (defined by the particles) and the shallow water surface, t$_g$ u$_s$ is subtracted from each particle position at the top of an the wave, allowing a smooth transition from the height field values of the wave mesh. A wave sheet may be detached from underlying fluid to simulate wave breaking.

Once a wave sheet is detached from underlying fluid, motion of the wave sheet is primarily determined by initial velocity and gravity. Persons skilled in the art will recognize that Euler steps are sufficient to integrate velocity and position over time. After a time step update, collision detection with the fluid surface of the SW simulation may be performed to simulate mass falling back into bulk liquid (surface water). When a collision is detected the SW simulation represents a distortion at particle position X as H(X)=H(X)+p$_m$, while eight neighbors of the shallow water node may be displaced by p$_m$/8. In one embodiment, fluid mass is not explicitly transported with a wave patch, as modifications of the height field along the wave front tend to distort the wave motion, leading to noise within the SW simulation.

Particles and their associated connectivity may be used to directly render wave patches. The wave patches already represent a closed surface, but no thickness is represented. To create thickness and an appearance of volume, a second instance of a given wave patch is generated in an offset position that is downward along a normal direction from the original wave patch. Vertices along the edges of the two instances of the wave patch may be stitched together to create a closed mesh.

Real breaking waves start breaking in a given position, and the breaking effect starts spreading outward along the wave front. To simulate this effect, a mid point from an associated wave line is selected as a tip of the breaking wave. Wave patches are then generated from an enlarging region centered around the initial point. This approach permits easy generation of texture coordinates for the fluid surface of the wave patch, allowing the wave patch to assume a consistent texture pattern relative to an associated wave. For a point on a wave line L, an appropriate set of texture coordinates is given by the wave patch lifetime and position in the wave line.

Standard particles may be used when a wave sheet hits surface water, creating a spray of smaller particles, creating a more realistic appearance of the breaking wave.

Two-way rigid body coupling provides a mechanism for rigid objects to interact with the water surface and vice versa. A straight-forward approach for simulating this interaction is to have each rigid body push down on underlying water columns, based on an associated mass of the rigid body. To conserve water volume, water volume displaced by a rigid body is added to or removed from each column within the domain. Any technically feasible technique may be used to simulate two-way rigid body coupling.

Figure 6:
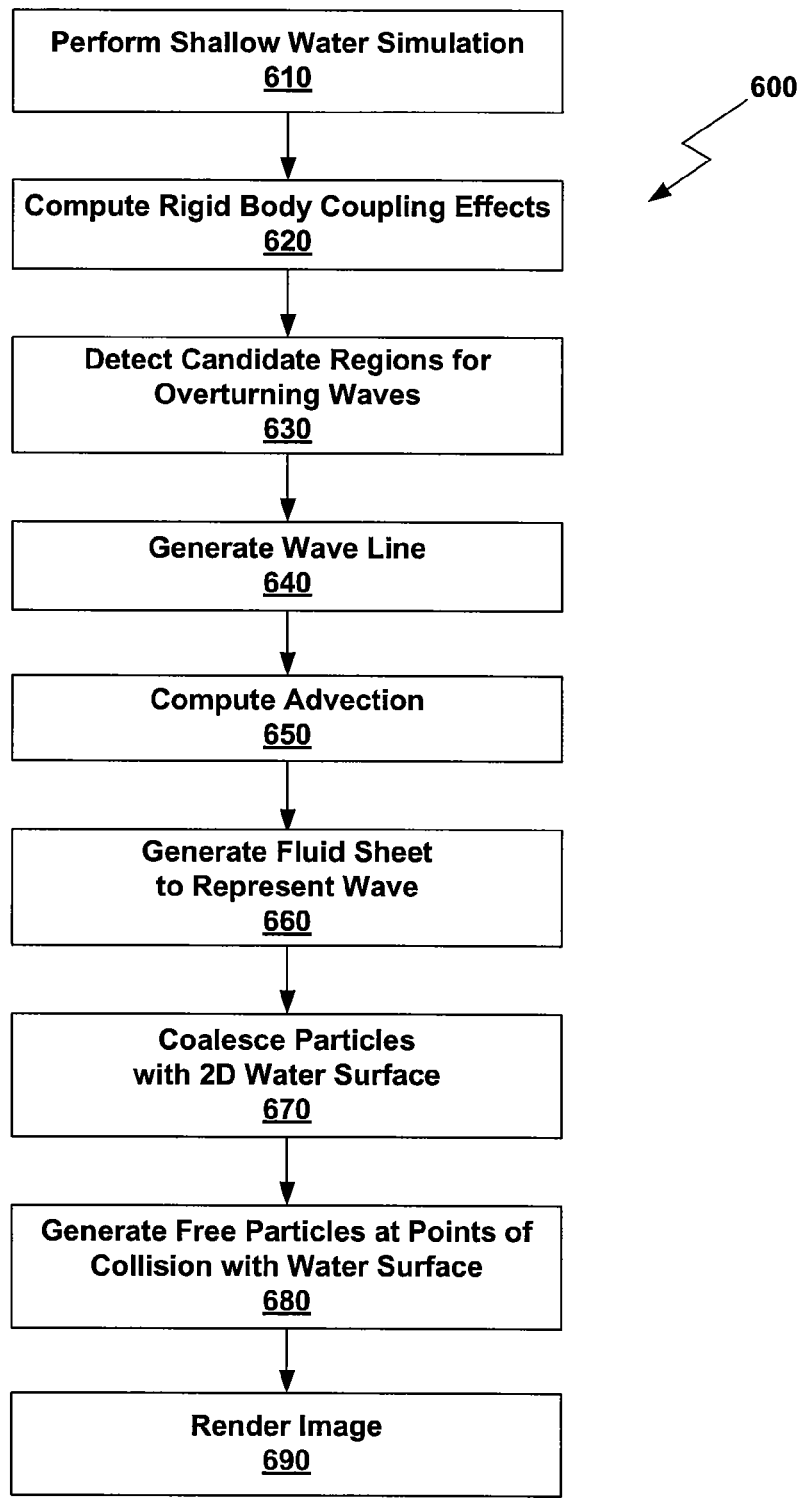
FIG. 6 is a flow diagram of method steps for simulating breaking waves, according to one embodiment of the invention.

FIG. 6 is a flow diagram of method steps 600 for simulating breaking waves, according to one embodiment of the invention. Although the method steps are described in conjunction with the systems of FIG. 1, persons skilled in the art will understand that any system configured to perform the method steps, in any order, is within the scope of the invention. The method is performed for sequential time steps, starting with an initial time step and continuing for the lifetime of a simulation session. The simulation session may be executed in relation to a software application executing on a host, such as application 150 of FIG. 1.

The method begins in step 610, where the application performs a shallow water simulation to generate a height field and a velocity field. Persons skilled in the art will recognize that various techniques may be used to perform the shallow water simulation, which may execute on the CPU 102 or the parallel processing subsystem 112. In step 620, the application modifies the height field and velocity field by computing rigid body coupling effects to accommodate rigid bodies within the simulation. The shallow water simulation and effects of rigid body coupling may be computed using any technically feasible technique. After step 620, a height field is available that describes a liquid surface and velocity vectors, which are primary outputs of the shallow water simulation.

In step 630, the application detects candidate regions for overturning waves. Each simulation grid cell with a sufficiently sharp height gradient should be marked as a candidate grid cell and may be included in a candidate region. Surrounding grid cells within a specified distance of each candidate grid cell may be included in a broadened detection region. In step 640, the application uses grid cells within the broadened detection regions to generate a wave line. In step 650, the application computes advection of the wave line by projecting points on the wave line forward in accordance with forward motion of a corresponding wave. In step 660, the application generates a fluid sheet to represent a corresponding wave. The fluid sheet comprises a mesh of connected particles. In step 670, the application coalesces particles that have collided with a 2D water surface. In step 680, the application spawns free particles at collision locations between falling wave sheets (connected particles) and the 2D water surface. Persons skilled in the art will recognize that collision detection and free particle simulation may be performed using any technically feasible technique. The method terminates in step 690, where the application renders a graphics image from data generated in steps 610 through 680.

In sum, a real-time method is disclosed for simulating breaking waves. A two-dimensional shallow water simulation with rigid body coupling generates a height field and velocity field. The height field and velocity field are used to identify candidate regions for overturning waves. For each candidate region, a wave line may be generated along with advection of the wave line. Fluid sheets are generated from the wave lines, where a fluid sheet comprises particles generated from points on the wave lines. A fluid sheet may detach from underlying liquid and accelerate downward, eventually resulting in a collision with a water surface. Upon collision with the water surface, the particles are coalesced. The shallow water simulator and wave breaking simulation execute according to a specified time step. A graphics image may be rendered after each time step.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A method for simulating a breaking wave, the method comprising:
    generating a height field and a velocity field at a first time step using shallow water simulation;
    computing rigid body coupling effects to account for rigid bodies within the height field and velocity field;
    modifying the height field and velocity field based on the rigid body;
    detecting candidate regions for one or more overturning waves;
    generating a first wave line within a first candidate region that represents the wave front of a corresponding wave;
    generating a second wave line for the corresponding wave by projecting points on the first wave line forward by one time step relative to the first time step; and
    generating a fluid sheet that represents the corresponding wave based on points from the first wave line and points on the second wave line.

2. The method of claim 1, wherein the fluid sheet includes a plurality of connected particles, and further comprising the step of coalescing one or more connected particles with a two-dimensional water surface, wherein the one or more connected particles collide with the two-dimensional water surface.

3. The method of claim 2, further comprising the step of generating one or more free particles in response to the one or more connected particles colliding with the two-dimensional water surface.

4. The method of claim 1, wherein the step of detecting candidate regions comprises:
    identifying one or more candidate grid cells with height gradients larger than a specified threshold;
    incorporating the one or more candidate grid cells within a detection region; and
    incorporating one or more surrounding grid cells to a broadened detection region, wherein each surrounding grid cell reside within a threshold distance of at least one candidate grid cell.

5. The method of claim 4, wherein candidate and surrounding grid cells within a threshold distance of the first wave line are removed from the broadened detection region.

6. The method of claim 1, wherein the step of generating the first wave line comprises:
   defining a first point on the first wave line;
   computing a first tangent direction from the first point;
   adding a second point to the first wave line along the first tangent direction;
   computing a second tangent direction from the first point; and
   adding a third point to the first wave line along the second tangent direction.

7. The method of claim 6, wherein the step of defining a first point on the first wave line comprises randomly selecting a point from a candidate grid cell, and each candidate grid cell has height gradients larger than a specified threshold.

8. The method of claim 1, wherein the step of computing the second wave line comprises:
   for each point on the first wave line, projecting the point forward to a wave crest and then from the wave crest to a wave front one step in time forward relative to the first time step;
   removing from the second wave line projected points that are inconsistent with a velocity associated with the corresponding wave;
   removing from the second wave line projected points that satisfy a close proximity threshold; and
   adding a point to the second wave line each time two projected points satisfy a minimum distance threshold.

9. The method of claim 1, wherein the step of generating a fluid sheet comprises:
   generating one or more particles for each point on the first wave line and each point on the second wave line;
   connecting the one or more particles to form a closed surface;
   generating a second instance of the closed surface by projecting the closed surface downward along a normal; and
   stitching together the closed surface and the second instance of the closed surface to form a closed mesh.

10. The method of claim 9, wherein the motion of the closed mesh associated with the fluid sheet is determined based on an initial velocity parameter and a gravity parameter.

11. A non-transitory computer-readable medium including instructions that, when executed by a processing unit, cause the processing unit to simulate a breaking wave, by performing the steps of:
   generating a height field and a velocity field at a first time step using shallow water simulation;
   computing rigid body coupling effects to account for rigid bodies within the height field and velocity field;
   modifying the height field and velocity field based on the rigid body
   detecting candidate regions for one or more overturning waves;
   generating a first wave line within a first candidate region that represents the wave front of a corresponding wave;
   generating a second wave line for the corresponding wave by projecting points on the first wave line forward by one time step relative to the first time step; and
   generating a fluid sheet that represents the corresponding wave based on points from the first wave line and points on the second wave line.

12. The non-transitory computer-readable medium of claim 11, wherein the fluid sheet includes a plurality of connected particles, and further comprising the step of coalescing one or more connected particles with a two-dimensional water surface, wherein the one or more connected particles collide with the two-dimensional water surface.

13. The non-transitory computer-readable medium of claim 12, further comprising the step of generating one or more free particles in response to the one or more connected particles colliding with the two-dimensional water surface.

14. The non-transitory computer-readable medium of claim 11, wherein the step of detecting candidate regions comprises:
   identifying one or more candidate grid cells with height gradients larger than a specified threshold;
   incorporating the one or more candidate grid cells within a detection region; and
   incorporating one or more surrounding grid cells to a broadened detection region, wherein each surrounding grid cell reside within a threshold distance of at least one candidate grid cell.

15. The non-transitory computer-readable medium of claim 14, wherein candidate and surrounding grid cells within a threshold distance of the first wave line are removed from the broadened detection region.

16. The non-transitory computer-readable medium of claim 11, wherein the step of generating the first wave line comprises:
   defining a first point on the first wave line;
   computing a first tangent direction from the first point;
   adding a second point to the first wave line along the first tangent direction;
   computing a second tangent direction from the first point; and
   adding a third point to the first wave line along the second tangent direction.

17. The non-transitory computer-readable medium of claim 16, wherein the step of defining a first point on the first wave line comprises randomly selecting a point from a candidate grid cell, and each candidate grid cell has height gradients larger than a specified threshold.

18. The non-transitory computer-readable medium of claim 11, wherein the step of computing the second wave line comprises:
   for each point on the first wave line, projecting the point forward to a wave crest and then from the wave crest to a wave front one step in time forward relative to the first time step;
   removing from the second wave line projected points that are inconsistent with a velocity associated with the corresponding wave;
   removing from the second wave line projected points that satisfy a close proximity threshold; and
   adding a point to the second wave line each time two projected points satisfy a minimum distance threshold.

19. The non-transitory computer-readable medium of claim 11, wherein the step of generating a fluid sheet comprises:
   generating one or more particles for each point on the first wave line and each point on the second wave line;
   connecting the one or more particles to form a closed surface;
   generating a second instance of the closed surface by projecting the closed surface downward along a normal; and
   stitching together the closed surface and the second instance of the closed surface to form a closed mesh.

20. The non-transitory computer-readable medium of claim 19, wherein the motion of the closed mesh associated with the fluid sheet is determined based on an initial velocity parameter and a gravity parameter.

* * * * *